United States Patent [19]

Hess

[11] 3,760,253
[45] Sept. 18, 1973

[54] TWO-WAY DRIVE FOR OPTICAL SYSTEMS AND THE LIKE

[75] Inventor: Karl-Gunter Hess, Waldlaubersheim, Germany

[73] Assignee: Jos. Schneider & Co. Optische Werke, Bad Kreuznach/Rhld., Germany

[22] Filed: Jan. 12, 1972

[21] Appl. No.: 217,166

Related U.S. Application Data

[63] Continuation-in-part of Ser. No. 80,018, Oct. 12, 1970, Pat. No. 3,673,483.

[52] U.S. Cl. .............................................. 318/618
[51] Int. Cl. .............................................. G05b 5/01
[58] Field of Search ................... 318/618, 635, 666, 318/681

[56] References Cited
UNITED STATES PATENTS
3,673,483  6/1972  Hess.................................. 318/618

Primary Examiner—Bernard A. Gilheany
Assistant Examiner—W. E. Duncanson, Jr.
Attorney—Karl F. Ross

[57] ABSTRACT

A load, such as a servomotor for the positioning (e.g., tilting) of a television camera, is operable by a control circuit provided with an input ($E_1$) for a speed signal. The positioning signal is applied, together with a feedback signal ($E_2$) from a position sensor, to a comparator generating an error signal of corresponding polarity whose magnitude is controlled, in response to the speed signal, by a limiter in the output of the comparator. A reversible load motor, coupled with the position sensor, also drives a generator to produce a reference signal of either polarity, the difference between the error signal and the reference signal producing a drive voltage of one or the other polarity for the load motor until the system is in balance. The limiter includes two differentially connected amplifiers driven in parallel by the speed signal to produce a positive and a negative operating voltage of identical magnitudes for two transistors of opposite conductivity types simultaneously energized by the error signal.

4 Claims, 2 Drawing Figures

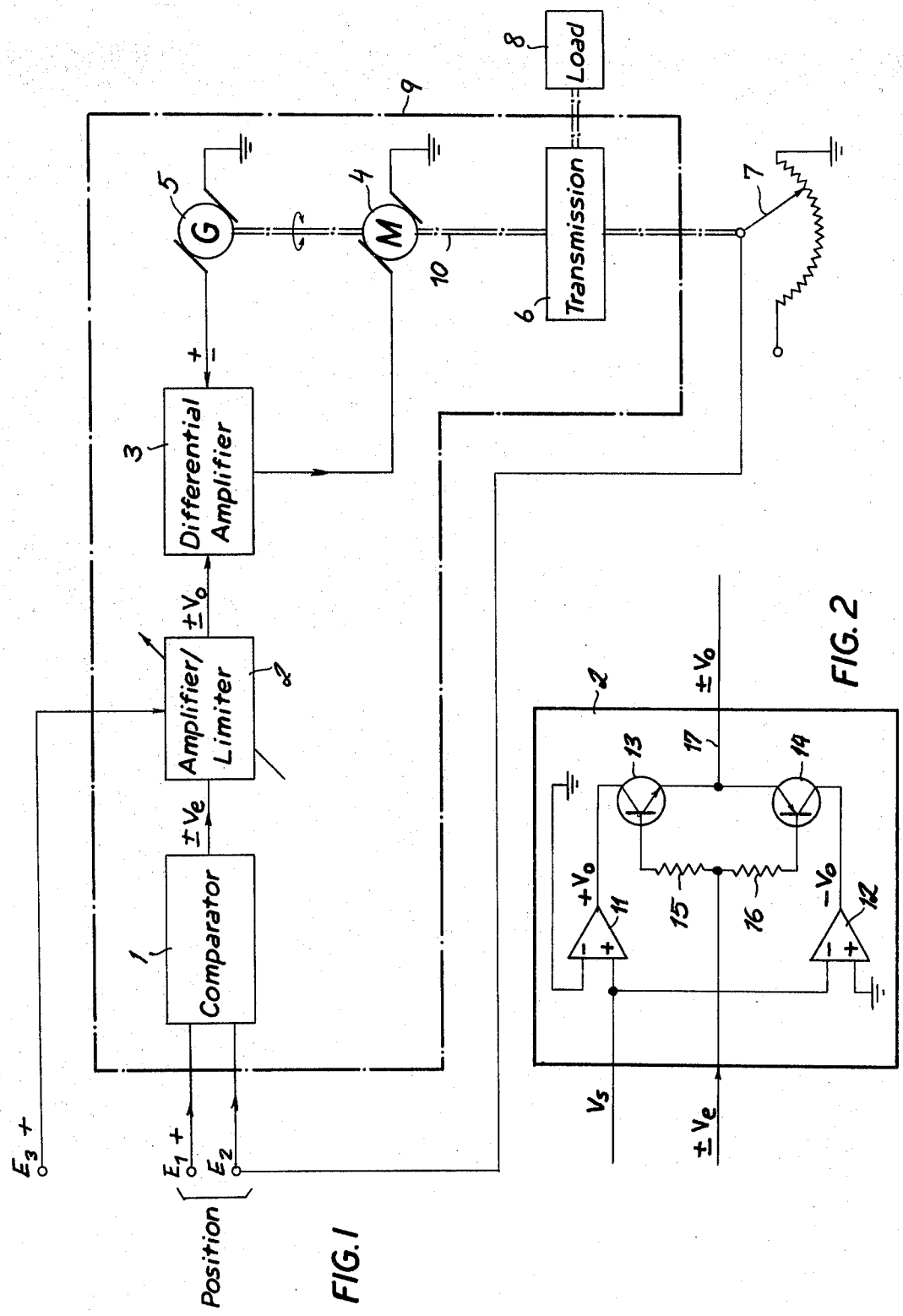

TWO-WAY DRIVE FOR OPTICAL SYSTEMS AND THE LIKE

This application is a continuation-in-part of my copending application Ser. No. 80,018 filed 12 Oct. 1970, now U.S. Pat. No. 3,673,483.

My present invention relates to a control system for the positioning of a reversible load.

The general object of this invention is to provide means for reversibly displacing such a load at a constant but readily adjustable rate, thus at a speed which is independent of the distance between the actual load position and the position sought to be obtained; this is particularly important in cases where the load is a mechanical component of an optical objective, a television camera or some other optical device requiring smooth transition from one position to another.

A more particular object is to provide means in such a system for adjusting the load speed without affecting the sensitivity and accuracy of its driving mechanism.

These objects are realized, pursuant to my invention, by the provision of a reversible drive motor coupled not only with the load but also with a tachometer and with a position-sensing device, the latter generating a feedback signal indicative of load position whereas the former produces a reference signal of a polarity and magnitude determined by the direction and speed of motor rotation. A comparison circuit receives both the feedback signal and an externally (e.g., manually) applied positioning signal for deriving a bipolar error signal from the difference thereof; a limiter in the output of the comparison circuit clips the error signal to make its magnitude independent of the value of the difference between the two input signals. The clipped error signal, whose magnitude is adjustable in accordance with a desired motor speed, is impressed upon one input of a differential circuit (e.g., amplifier) whose other input receives the reference signal from the tachometer; the output of this differential circuit constitutes a driving voltage of either polarity which actuates the load motor in a sense tending to reduce the error signal to zero.

According to a more particular feature of this invention, the limiter includes a pair of differentially connected operational amplifiers both driven by an input voltage acting as a speed signal to produce a positive and a negative operating voltage of identical magnitudes for the collectors of two transistors of opposite conductivity types, i.e., NPN and PNP, whose bases are simultaneously energized by the error signal. Depending on the polarity of the latter signal, only one or the other transistor is saturated and transmits its adjustable collector voltage to a common emitter terminal feeding the differential circuit.

Thus, the motor speed in either direction is determined solely by the speed signal regardless of the relative magnitudes of the positioning signal and of the feedback signal derived from the position sensor. The positioning signal may be supplied by any conventional voltage source (e.g., a potentiometer) whose output varies in magnitude according to the spacing of a desired load position from a predetermined reference position. The load, therefore, will approach its new position at a selected speed independent of the distance it has to travel, this being true for either sense of displacement.

The invention will be described in greater detail hereinafter with reference to the accompanying drawing in which:

FIG. 1 diagrammatically illustrates a representative embodiment; and

FIG. 2 is a more detailed circuit diagram of one of the components of the system of FIG. 1.

In FIG. 1 I have shown a conventional comparator 1 whose two inputs $E_1$, $E_2$ receive an externally applied positioning signal and an internally generated feedback signal, respectively. The positioning signal, here positive, may be larger or smaller than the feedback signal whenever the system is unbalanced by the operation of the voltage source connected to input $E_1$. There results, accordingly, a positive or negative error signal $V_e$ in the output of the comparator, this error signal being fed to an amplifier/limiter 2 having a control input $E_3$ which carries a speed signal $V_s$ (here also positive) of selected magnitude. Limiter 2, more fully illustrated in FIG. 2, clips both the positive and the negative output voltages of comparator 1 so that, in the presence of a significant error signal issuing from the comparator, a voltage $V_o$ of magnitude $+kV_s$ is generated within that component where $k$ is a fixed parameter.

As shown in FIG. 2, limiter 2 comprises a pair of operational amplifiers 11, 12 receiving the speed signal $V_s$ on their noninverting and inverting input terminals, respectively, the other input terminal of each amplifier being held at a common reference potential (ground). With the two amplifiers identically constructed, stage 11 generates an output voltage $+V_o$ whereas stage 12 generates an output voltage $-V_o$ of the same absolute magnitude $kV_s$. Amplifiers 11 and 12 feed the collectors of an NPN transistor 13 and a PNP transistor 14, respectively; the bases of the two transistors are connected, through identical resistors 15 and 16, to the output of comparator 1 (FIG. 1) carrying the error signal $+V_e$. The emitters of these transistors are connected by way of a common lead 17 to differential amplifier 3.

Whenever absolute magnitude of error signal $V_e$ exceeds a predetermined threshold value, transistor 13 or 14 saturates, depending on its polarity. This operation applied virtually the full operating voltage $+V_o$ or $-V_o$ to lead 17 so that differential amplifier 3 (FIG. 1) receives the control signal $+kV_s$ or $-kV_s$. The other input of amplifier 3 is fed a reference voltage from a tachometer 5 shown as an electric voltage or current generator. Differential amplifier 3 lies in the input circuit of a reversible load motor 4 which is mechanically connected, via a linkage 10, with generator 5 and with a transmission 6 for driving a position sensor 7 and a load 8. Sensor 7, here shown as a potentiometer, generates the feedback signal applied to comparator input $E_2$; this sensor may also include an amplifier for the feedback signal. Load 8 may comprise, for example, a servomechanism for tilting or swinging a television camera within a predetermine angular range.

A common housing 9, indicated schematically, is shown to enclose the components 1–6 of my improved two-way drive for the load 8. Components 1–3 may be constituted by individually replaceable modules interconnected by plug-and-jack couplings. Limiter 2 may be combined with comparator 1 to a single module.

The constancy (for a given setting of control input $E_3$) of the displacement rate of the load 8 in response to any voltage difference in the input of comparator 1 limits the period of the instability, i.e., the time during which the system seeks its new equilibrium, to a predetermined maximum; such a system can therefore also be used as an analog/digital converter, e.g., for data transmission, with a fixed operating cycle in the course of which an analog voltage applied to input $E_1$ brings about a selected operating position for load 8 to generate (as by the selective closure of a set of contacts) the binary equivalent of the input signal. In such a case, the feedback voltage delivered by sensor 7 may vary in predetermined increments (rather than continuously) to establish the necessary number of discrete load positions.

The system herein disclosed can also be conveniently operated by such digital/analog converters supplying the only two variables needed for control, i.e., the position signal at $E_1$ and the speed signal at $E_3$.

I claim:

1. A control system for the positioning of a reversible load, comprising:
 a reversible drive motor for said load provided with an input circuit;
 a tachometer coupled with said motor for producing a reference signal of a polarity and magnitude determined by the direction and speed of motor rotation;
 a source of adjustable control voltage;
 position-sensing means coupled with said motor for generating a feedback signal indicative of load position;
 comparison means connected to receive said feedback signal together with a positioning signal and for deriving a bipolar error signal from the difference thereof;
 limiter means in the output of said comparison means for making the magnitude of said error signal independent of the value of said difference, said limiter means being provided with an input connection to said source for selectively varying the magnitude of said error signal; and
 differential circuitry in said input circuit connected to receive said reference signal from said tachometer and a modified error signal from said limiter means for deriving therefrom a driving voltage of either polarity to actuate said motor in a sense tending to reduce said difference;
 said limiter means comprising an NPN transistor and a PNP transistor with bases connected to said comparison means for receiving said error signal therefrom, with collectors connected to said source for simultaneous energization by operating voltages of like magnitudes but opposite polarities, and with emitters jointly connected to said differential circuitry for delivering said modified error signal thereto.

2. A system as defined in claim 1 wherein the coupling between said motor, said tachometer and said position-sensing means includes a mechanical transmission.

3. A system as defined in claim 2, further comprising a common housing for said comparison means, limiter means, differential circuitry and transmission.

4. A system as defined in claim 1 wherein said limiter means further comprises a pair of operational amplifiers differentially connected between said source and said collectors for supplying the latter with said operating voltages.

* * * * *